United States Patent
Haase et al.

(10) Patent No.: US 12,206,309 B2
(45) Date of Patent: Jan. 21, 2025

(54) BIAXIAL POSITIONING DEVICE

(71) Applicant: PHYSIK INSTRUMENTE (PI) GMBH & CO. KG, Karlsruhe (DE)

(72) Inventors: Thomas Haase, Steinweiler (DE); Eric Kohler, Bruchsal (DE)

(73) Assignee: PHYSIK INSTRUMENTE (PI) GMBH & CO. KG, Karlsruhe (DE)

( * ) Notice: Subject to any disclaimer, the term of this patent is extended or adjusted under 35 U.S.C. 154(b) by 14 days.

(21) Appl. No.: 17/616,049

(22) PCT Filed: May 20, 2020

(86) PCT No.: PCT/DE2020/100439
§ 371 (c)(1),
(2) Date: Dec. 2, 2021

(87) PCT Pub. No.: WO2020/233753
PCT Pub. Date: Nov. 26, 2020

(65) Prior Publication Data
US 2022/0320987 A1  Oct. 6, 2022

(30) Foreign Application Priority Data

May 20, 2019  (DE) .................... 10 2019 113 296.7

(51) Int. Cl.
*H02K 41/03* (2006.01)
*H02K 41/02* (2006.01)

(52) U.S. Cl.
CPC ......... *H02K 41/02* (2013.01); *H02K 2211/03* (2013.01)

(58) Field of Classification Search
CPC ........ H02K 41/00; H02K 41/02; H02K 41/03; H02K 41/031; H02K 41/035; H02K 3/00; H02K 3/26
See application file for complete search history.

(56) References Cited

U.S. PATENT DOCUMENTS

| | | | |
|---|---|---|---|
| 2012/0119593 A1* | 5/2012 | Yajima | H02K 41/031 310/12.21 |
| 2013/0154399 A1* | 6/2013 | Schneider | B23Q 5/28 310/12.31 |

(Continued)

FOREIGN PATENT DOCUMENTS

| | | |
|---|---|---|
| DE | 102015222400 A1 | 6/2017 |
| JP | H05316712 A | 11/1993 |

(Continued)

OTHER PUBLICATIONS

International Search Report and Written Opinion with regard to PCT/DE2020/100439 mailed Sep. 3, 2020, and English Translation.

(Continued)

*Primary Examiner* — Tran N Nguyen
(74) *Attorney, Agent, or Firm* — The Juhasz Law Firm

(57) ABSTRACT

A biaxial positioning device is described. The positioning device includes: a stationary base element; a first positioning element movably mounted relative to the base element along a first direction by means of a first guide device; a second positioning element movably mounted relative to the first positioning element along a second direction, which is different to the first direction, by means of a second guide device; a first drive for adjusting the first positioning element along the first direction of movement; and a second drive for adjusting the second positioning element along the second direction of movement. The stationary base element and the second positioning element each have a printed circuit board, and the first positioning element is a metal support element and is disposed between the base element and the second positioning element.

7 Claims, 6 Drawing Sheets

(56) References Cited

U.S. PATENT DOCUMENTS

Figure 1:
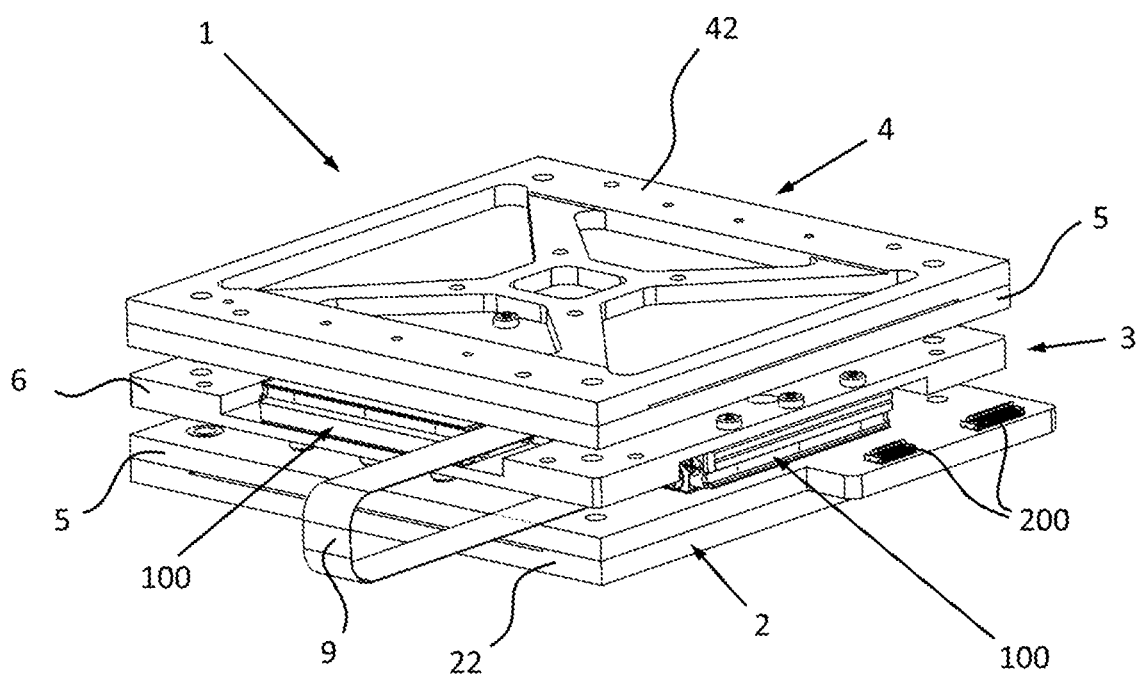

| | | | |
|---|---|---|---|
| 2015/0137624 A1* | 5/2015 | Wu | H02K 41/031 |
| | | | 310/12.05 |
| 2016/0241120 A1* | 8/2016 | Usui | H02K 41/031 |
| 2018/0056329 A1* | 3/2018 | Akanuma | H02K 33/16 |
| 2018/0212505 A1 | 7/2018 | Ding | |
| 2018/0241325 A1 | 8/2018 | McCarthy | |
| 2018/0367711 A1 | 12/2018 | Topliss et al. | |

FOREIGN PATENT DOCUMENTS

| | | | |
|---|---|---|---|
| JP | 3832891 B2 * | 10/2006 | |
| JP | 2008283773 A | 11/2008 | |
| JP | 4370042 B2 * | 11/2009 | |

OTHER PUBLICATIONS

English Abstract for JPH05316712 retrieved on Espacenet on Dec. 1, 2021.

English Abstract for DE102015222400 retrieved on Espacenet on Dec. 1, 2021.

English Abstract for JP2008283773 retrieved on Espacenet on Dec. 1, 2021.

\* cited by examiner

BIAXIAL POSITIONING DEVICE

The invention relates to a two-axis positioning device according to claim 1.

From US 2018/0241325 A1 a generic two-axis positioning device with a stationary base element and two positioning elements which can be adjusted in different directions (X and Y directions) relative to the base element is known, wherein the two-axis positioning device comprises two electromagnetic linear motors for driving the respective positioning element, a motion controller and a driver device. The base element and the two positioning elements are here arranged stacked one above the other, and the positioning element, which is arranged between the base element and the other positioning element, is realized as a circuit board (PCB).

On or at the circuit board, in addition to the motion controller and the driver device, also on both sides, i.e. on their top and bottom, the coil elements of the electromagnetic linear motors and of the linear guiding devices are disposed, wherein both for the adjustment in the X-direction and in the Y-direction two linear guides which are arranged parallel to one another are provided.

Disadvantageous with the two-axis positioning device known from US 2018/0241325 A1 are the low manufacturing tolerances which normally occur with conventional circuit boards with a support material made of glass fibre mats (FR-4) which are impregnated with epoxy resin and the low stiffness of the circuit boards with common circuit board thicknesses. The low manufacturing tolerances, which primarily result from the manufacturing process related to the used materials, cause in particular a low level of planarity of the circuit board, so that a highly precise and defined alignment of the linear guiding devices or the alignment of the two linear guides for each adjustment direction to each other is impeded. An inaccurate alignment of the two linear guides responsible for realizing an adjustment direction can result in that, during the adjustment or positioning, undesired forces are introduced into the circuit board or into the linear guides, wherein forces which are introduced into the circuit board can cause deformations of the same, which is further favoured by the low stiffness of the circuit board, while forces which are introduced into the linear guides can cause an increased friction. Deformations of the circuit board can have, in a mechanical aspect, a negative effect on the adjustment accuracy or positioning accuracy of the two-axis positioning device. In addition, deformations of the circuit board also have a negative effect on measuring systems or sensor systems which are arranged on the circuit board or are integrated in the same, whereby measurement inaccuracies or errors may result.

Deformations of the circuit board can, however, also result from the forces acting between the magnets and the coils of the electromagnetic linear motors for realizing a drive, since the generated forces do not exclusively point in the respective drive direction.

Another disadvantage of the two-axis positioning device according to US 2018/0241325 A1 is the effort required to fasten the individual components to the circuit board and, in particular, to the linear guiding devices. As a rule, press-in sleeves which comprise an internal thread and which are subsequently inserted into the circuit board are to be used here. Since the press-fit sleeves normally comprise a collar with which the same are supported on the surface of the circuit board, the press-fit sleeves protrude over the surface of the circuit board addition by which the total height of the two-axis positioning device is enlarged.

Another disadvantage of the two-axis positioning device known from US 2018/0241325 A1 arises from the fact that those electromagnetic fields which are produced by the coils of the electromagnetic drive can penetrate the circuit board practically unhindered and there can influence currents in conductor tracks which are not used for the electrical supply of the coils, for example currents from sensor components, which can also result in measurement inaccuracies or errors.

The invention is therefore based on the object of providing a two-axis positioning device which is improved in terms of accuracy and manufacturing costs.

This object is achieved by a two-axis positioning device with the features of claim 1.

For this purpose the stationary base element and the second positioning element each comprise a preferably identically realized circuit board, wherein the first positioning element is realized as a metallic support element and is disposed between the base element and the second positioning element.

Due to the metallic construction of the support element, the same can be manufactured highly precise under compliance with specified tolerances and, in particular, be extremely planar, for example by a lapping treatment of its surfaces, so that a correspondingly precise arrangement or alignment of the support or guiding devices is enabled. Sensor devices, in particular optical sensor devices, can also be arranged with high precision on such a flat surface.

In addition, the metallic construction of the first positioning element which is arranged between the base element and the second positioning element allows a simple processing and in particular the simple provision of bores or threaded bores which are very precisely positioned by which the elements which are to be arranged on the first positioning element can be fastened easily and at the same time mechanically stable. Due to the high rigidity of the metallic support element, it does not tend to become deformations, even in case of low thicknesses, which deformation can adversely affect the accuracy of the two-axis positioning device. Low thicknesses of the metallic support element or the first positioning element are advantageous in order to reduce the weight as much as possible for a high adjusting movement dynamic, wherein the thickness of the metallic support element can be made much thinner than a circuit board with the same rigidity.

In contrast, both the base element and the second positioning element comprise a circuit board, on which preferably all the elements to be supplied with electrical power or components of the two-axis positioning device are arranged or integrated therein, so that the first positioning element does not require any power supply. It is advantageous here if at least one motor driver is integrated in each of the two circuit boards. In addition, in the circuit boards communication modules (such as a WLAN module) can be integrated. In addition, the circuit boards can comprise integrated holding devices for sensor elements. Furthermore, the circuit boards preferably comprise electrical insulation and electrical through-plating. It is particularly preferred that all electrical connections (wiring) between the components or elements of the circuit boards are also integrated in the same. In addition, circuit boards can be used for cooling surfaces comprise heat removal. In a preferred embodiment, the circuit boards of the base element and the second positioning element are connected to a metallic support plate.

It can be advantageous that at least one of the two drives is realized as an electromagnetic drive comprising at least one coil element and at least one magnet arrangement, and that here the magnet arrangement preferably corresponds to a Halbach array. Even with a very flat construction, such a drive can generate high drive forces and at the same time can carry out very precise adjustment movements. The Halbach array arrangement of the magnets ensures a one-sided, strong magnetic field on the side facing the corresponding coil element, wherein a return element can be dispensed and the metallic support element can consist of a magnetically non-conductive metal. However, the invention is not limited to the use of electromagnetic drives for generating the adjustment movements of the first and second positioning elements. Also electric motors or piezoelectric drives are conceivable for this.

It can be of advantage here that on the top and bottom of the metallic support element in each case a magnet arrangement is located, and that the respective magnet arrangement co-acts with an oppositely arranged coil element. It can be of particular advantage here that the coil element is integrated into the circuit board. Due to the comparatively high weight, an attachment of the magnet arrangements on the metallic support element are advantageous, while the integration of the coil elements in the circuit boards results in an overall very flat construction of the two-axis positioning device. In addition, the integration of the coil elements into the circuit boards can be carried out already during the manufacture of the circuit boards, so that the assembly of the two-axis positioning device is much facilitated because fewer parts are to be assembled.

It can be advantageous that the circuit board of the base element is electrically connected to the circuit board of the second positioning element via a flexible connection element. Via this flexible connection element, a power supply for the circuit board of the second positioning element can be implemented by the circuit board of the base element, and it is also used to transmit electrical signals, for example for position control. The flexible connection element allows that the same is carried along without friction during adjustment movements of the two-axis positioning device, wherein, due to its high flexibility, it opposes only an extremely low resistance to corresponding adjustment movements.

Figure 2:
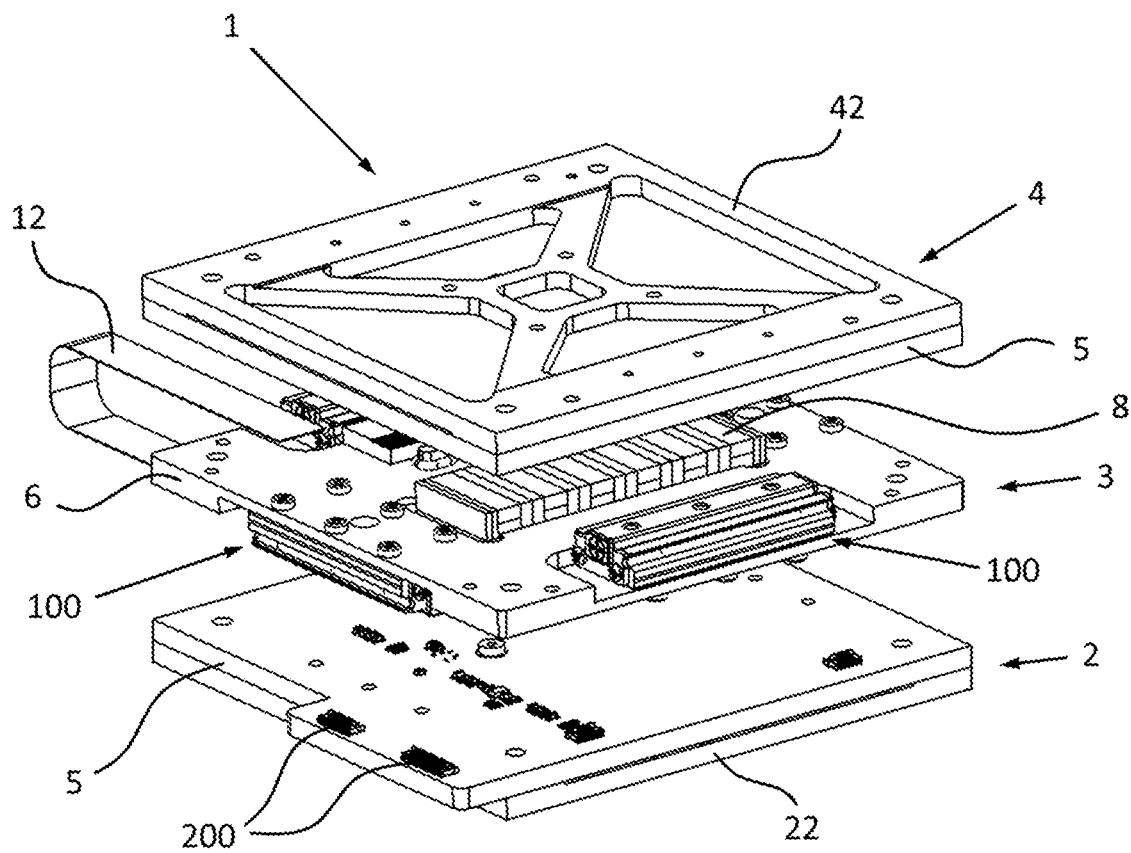

In addition, advantages and expediencies of the invention result from the following description of exemplary embodiments and aspects with reference to the figures. These figure show:

FIG. 1: a perspective view of an two-axis positioning device according to the invention FIG. 2: an exploded view of the two-axis positioning device according to FIG. 1

Figure 3:
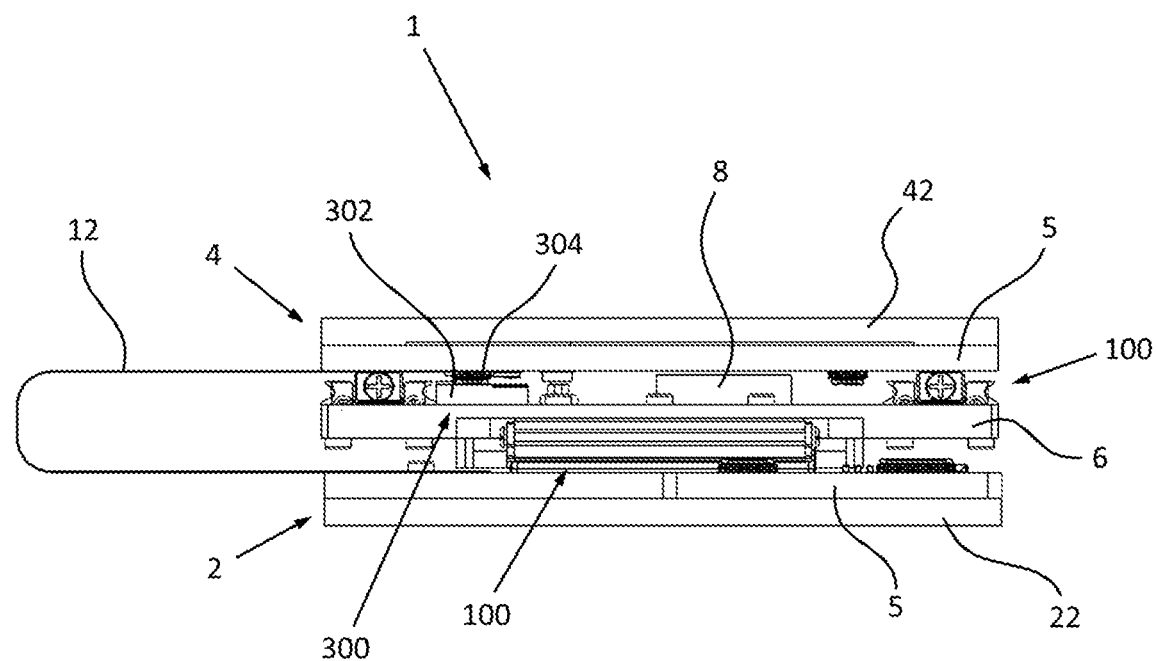

FIG. 3: a side view of the two-axis positioning device according to FIG. 1 and FIG. 2

Figure 4:
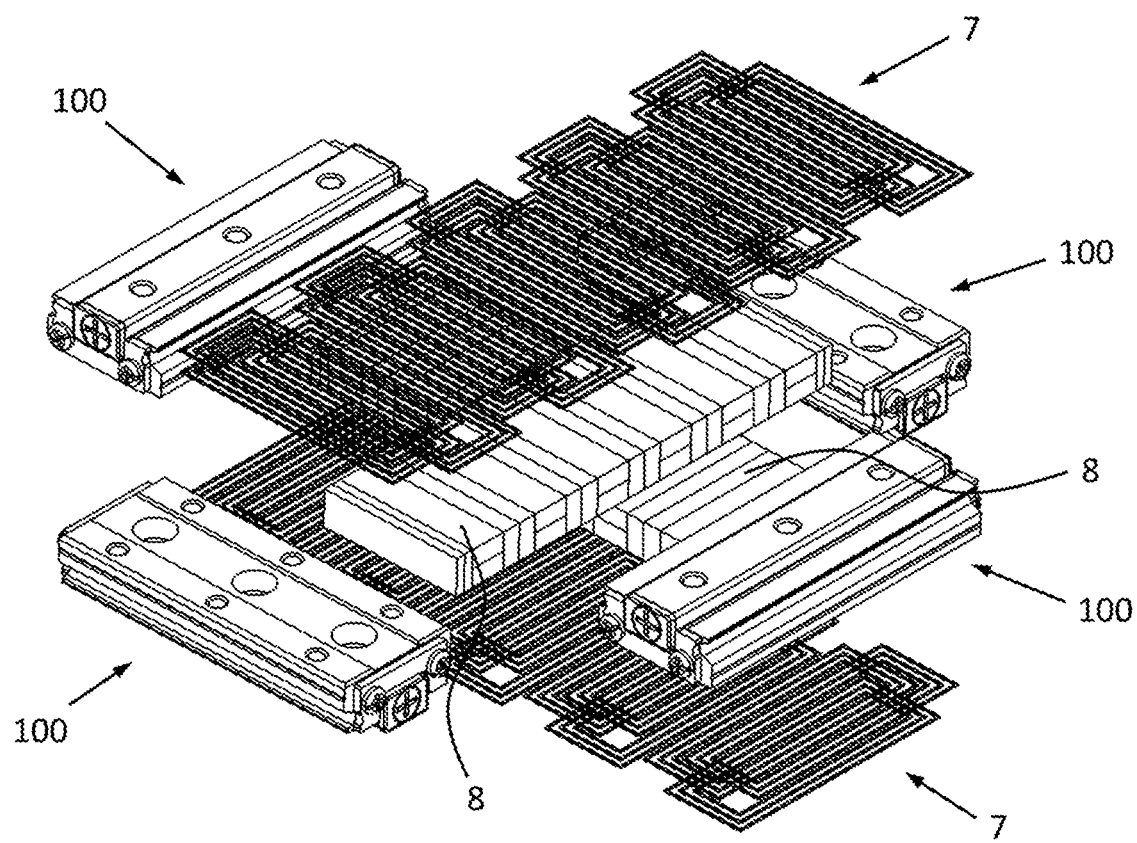
Figure 5:
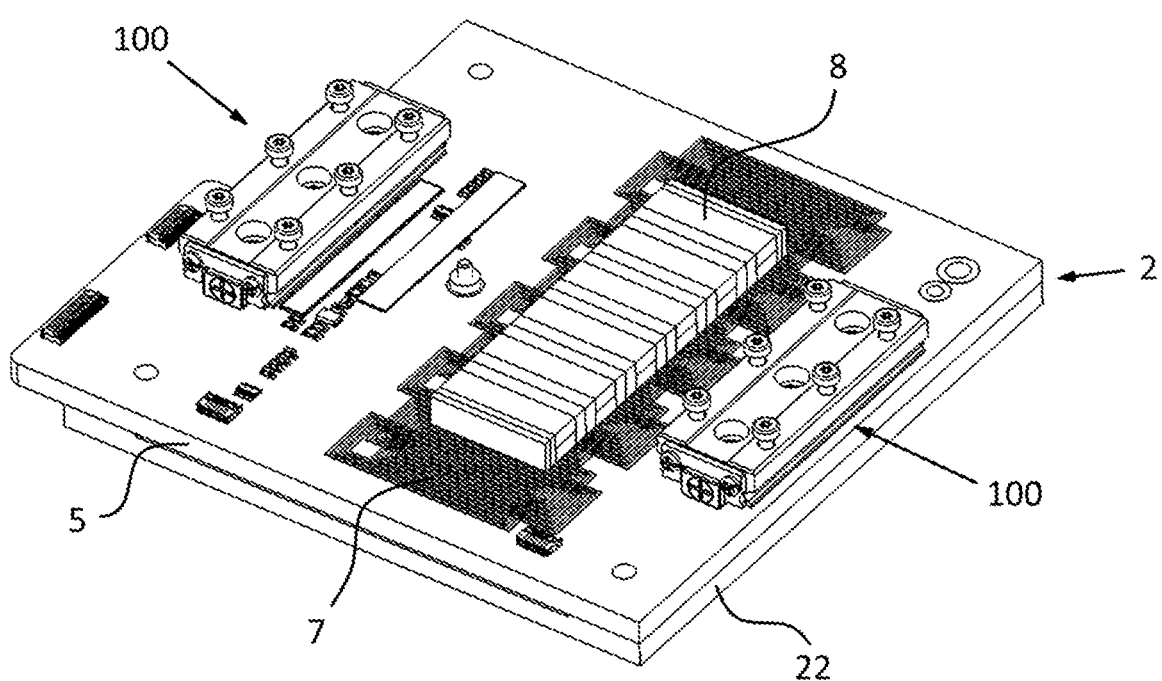
Figure 6A:
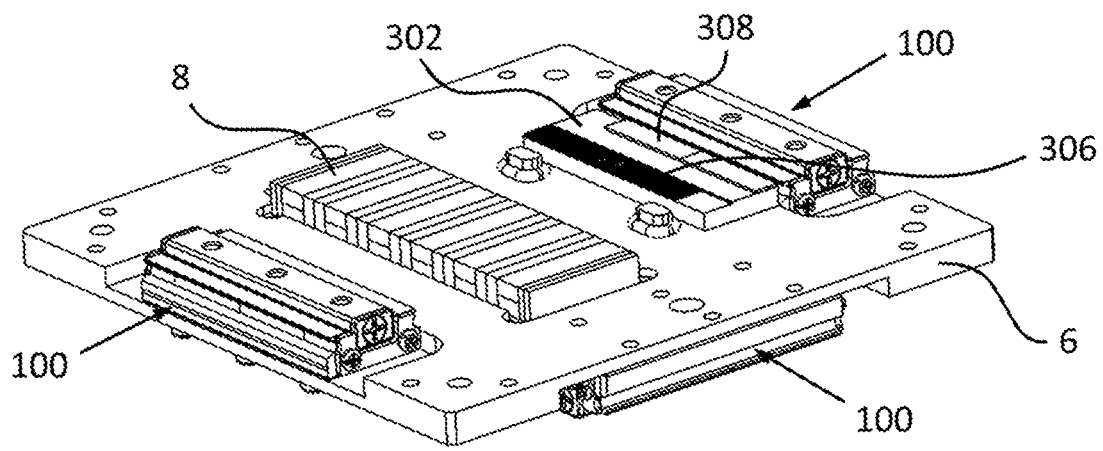
Figure 6B:
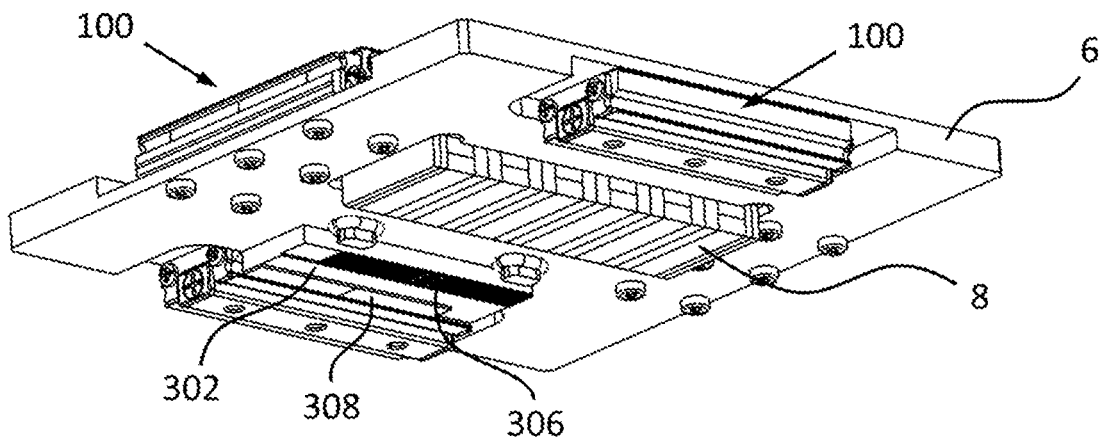

FIG. 4: a representation of details of the two-axis positioning device according to FIGS. 1 to 3 in perspective view FIG. 5: a representation of details of the two-axis positioning device according to FIGS. 1 to 3 in perspective view FIGS. 6A and 6B: different perspective views of the metallic support element of the two-axis positioning device according to FIGS. 1 to 3

According to FIG. 1, the two-axis positioning device 1 according to the invention comprises a three-layer or three-layer construction on with a base element 2 which is disposed at the bottom in FIG. 1 and which comprises a metallic support plate 22 and a circuit board 5 which is arranged thereon or connected to the same. The material of the circuit board 5 is a composite material made of epoxy resin and fiberglass fabric (FR-4). The circuit board 5 comprises two connector elements 200 for electrical contacting the two-axis positioning device. The same are partially embedded in the circuit board 5. One of the connector elements 200 is used for electricity supply or power supply for the electromagnetic drives of the two-axis positioning device used here, while the other of the two connector elements 200 functions as an interface (e.g. via USB, CAN, RS232, Ethernet or Ethercat) for the commanding of positioning movements or position targets of the two-axis positioning device. Coil elements are completely embedded in the circuit board 5 of the base element 2 which cannot be seen in FIG. 1. A motor driver integrated in the circuit board 5 of the base element 2 cannot be seen either.

The base element 2 located at the bottom is followed as a middle layer or ply by the first positioning element 3 in the form of a metallic support element 6 made of aluminium. Both on the upper side of the metallic support element 6 and on its underside, which faces the circuit board 5 of the base element 2, a magnet arrangement (not shown in FIG. 1) is arranged, which in each case corresponds to a Halbach array.

The top layer or ply of those shown in FIG. 1 the two-axis positioning device forms the second positioning element 4, which is constructed similarly to the base element 2 and, in addition to the circuit board 5, also comprises a metallic support plate 42 which is connected to the circuit board 5. A motor driver which is integrated in the circuit board 5 of the second positioning element 4 cannot be seen. Both the support plate 22 of the base element 2 and the support plate 42 of the second positioning element 4 primarily serve to connect the two-axis positioning device to or with superordinate structures, such as a stationary base and an object to be positioned in relation to the base. Appropriate mounting or connection devices such as threaded holes can easily be inserted into the metal support plates. Further, the metallic support plates 22 and 42 serve to increase the mechanical stability of the base element 2 and the second positioning element 4. This makes it possible, among other things, to realize the circuit boards 5 extremely thin.

However, constructions are also conceivable in which the support plate 22 of the base element 2 and the support plate 42 of the second positioning element 4 are dispensed with and in which the circuit boards 5 themselves comprise means with which a connection of the two-axis positioning device on higher-level structures is possible, for example by thread elements which are embedded in or pressed in the circuit boards. By means of such holding devices also bearings for moveable support of the positioning elements 3 and 4 can be arranged on the circuit boards 5. Furthermore, such holding devices can serve for holding or mounting of sensor elements on the circuit boards. In addition, the thickness of the circuit boards 5 can be varied or adapted, and circuit board structures of corresponding thickness can be used which themselves already comprise the mechanical stability required for the specific application.

In order to realize an electrical connection between the circuit board 5 of the base element 2 and the circuit board 5 of the second positioning element 4, a flexible and electrically conductive connection element 9 is provided, wherein the flexibility of which is sufficient to oppose the movements of the two positioning elements 3 and 4 only with very little resistance and wherein connection element 9 allows that the same can be carried along without friction during adjustment movements of the two-axis positioning device, wherein by the electrical connection on the one hand the electricity or power supply to the coil elements which are embedded in the circuit boards 5 and the additional components or elements which are integrated therein, such as motor drivers, sensor elements, communication modules etc., and on the other hand the forwarding of electrical signals, for instance for commanding positioning movements, is made possible.

For realizing a precisely guided linear movement along the two directions of movement disposed perpendicular to one another, the two-axis positioning device comprises a total of four linear guiding devices 100, two of which are arranged parallel and spaced apart from each other between the base element 2 and the first positioning element 3, and of which the remaining two are arranged parallel and spaced apart from each other between the first positioning element 3 and the second positioning element 4. It is also conceivable, to provide only one linear guiding device in each case for the two movement or adjustment directions which are disposed perpendicular to each other.

FIG. 2 corresponds to an exploded view of the two-axis positioning device according to FIG. 1. In comparison to the illustration according to FIG. 1, the linear guiding devices 100 can be seen more clearly. In addition, in FIG. 2 the magnet arrangement 8 in the form of a Halbach array is shown which cannot be taken from FIG. 1 and which is used in the electromagnetic drive for the second positioning element 4.

FIG. 3 corresponds to a side view of the two-axis positioning device 1 according to FIGS. 1 and 2. From FIG. 3 particularly the measurement device 300 can be taken which is additionally disposed between the metallic support element 6 and the second positioning element 4 and which comprises a scale 302 which is arranged on the metallic support element 6 and a sensor 304 which interacts with the scale 302, wherein the sensor 304 is disposed opposite to the scale 302 on the second positioning element 4, wherein the measurement device 300 serves for capturing or measurement of the position of the second positioning element 4 relative to the first positioning element 3 and for the position control of the second positioning element 4 derived from the position capturing. An measurement device 300 which is analogous to the one mentioned before and which cannot be taken from FIG. 3, is arranged on the underside of the metallic support element 6, which, in an analogous manner, is used for the capturing or measurement of the position of the metallic support element 6 in relation to the base element 2 and thus for the position control of the same.

In FIG. 4 only elements of the two-axis positioning device according to FIGS. 1 to 3 are shown which are individually exposed or cut out. These are the respectively interacting coil elements 7 and magnet arrangements 8 of the two electromagnetic drives. Since the coil elements 7 in the two-axis positioning device according to FIGS. 1 to 3 are completely embedded in the corresponding circuit board 5 and therefore would not be recognizable in the normal representation, they are shown cut out of the circuit board in FIG. 4. The magnet assemblies 8 are each fastened to the metallic support element 6, wherein the coil elements 7 and the magnet assemblies 8 are arranged opposite one another in pairs.

Each coil element 7 comprises three separate conductor tracks which are nested within one another, so that a three-phase control of the coil elements 7 is enabled. The magnet assemblies 8 each comprise a Halbach array and comprise a l direction of longitudinal extension that coincides with the direction of longitudinal extension of the associated coil element 7.

In FIG. 4, the total of four linear guiding devices 100 can also be clearly seen, wherein each of which is aligned in pairs parallel to one another and ensures the highly precise guidance of the associated positioning element in the respective guide direction.

FIG. 5 also shows only a few individually exposed or cut-out elements of the two-axis positioning device according to FIGS. 1 to 3. In particular, FIG. 5 shows the base element 2 and the coil element 7 which integrated or embedded in the circuit board 5 of the base element 2. Furthermore, FIG. 5 shows the magnet arrangement 8 in the form of a Halbach array which is assigned to the coil element 7, which together form the electromagnetic linear drive for the first positioning element 3. The magnet arrangement 8 is here arranged or mounted to the first positioning element 3 in the form of the metallic support element 6 which is not shown. In parallel with the direction of longitudinal extension of the coil element 7 or the magnet assembly 8, which corresponds to the drive direction of the electromagnetic drive, the two linear guiding devices 100 are arranged. These are connected on the one side to the circuit board 5 of the base element 3 and on the other side to the metallic support element 6 of the first positioning element 3.

FIG. 6 shows in the two representations FIGS. 6A and 6B the metallic support element 6 of the two-axis positioning device according to FIGS. 1 to 3 in different perspective views. FIG. 6A shows the upper side of the support element, while FIG. 6B shows the underside of the metallic support element. On the top of the metallic support element according to FIG. 6A two linear guiding devices 100, which are disposed in parallel alignment to one another, are arranged in corresponding recesses, and, between the same, the magnet arrangement 8 is located in an analogous alignment. In addition, a measuring element 302 of a corresponding measurement device, which comprises a scale 306 and a referencing track 308, is arranged on the upper side of the metallic support element.

The underside of the metallic support element is, according to FIG. 6B, equipped identically to its upper side and supports, in addition to two linear guiding devices 100, the magnet arrangement 8 and a measuring element 302 of a measurement device comprising a scale 306 and a referencing track 308. The alignment of the linear guiding devices 100 and the magnet arrangement 8 on the underside of the metallic support element is identical and is additionally disposed perpendicular to the alignment of the linear guiding devices 100 and the magnet arrangement 8, which are arranged on the upper side of the metallic support element.

It is conceivable to combine two or more of the above-described two-axis positioning devices with one another. It is also conceivable to combine one two-axis positioning device described above with a further positioning device, for example a further linear positioning device or a rotation positioning device or a tilt positioning device.

LIST OF REFERENCE SYMBOLS 1 two-axis positioning device
2 base element
3 first positioning element
4 second positioning element
5 circuit board
6 metallic support element
7 coil element
8 magnet arrangement
9 flexible connector
22 support plate
42 support plate
100 linear guiding device
200 connector element
300 measurement device
302 measuring element (of measurement device 300)
304 sensor (of measurement device 300)
306 scale (of measuring element 302)
308 referencing track (of measuring element 302)

The invention claimed is:

1. A two-axis positioning device, comprising a stationary base element, a first positioning element which is movably mounted relative to a base element along a first direction, a second positioning element which is movably mounted relative to the first positioning element along a second direction which deviates from the first direction, a first drive arranged on the first positioning element for adjusting the first positioning element along the first direction of movement, a second drive for adjusting the second positioning element along the second direction of movement,
   wherein the first drive comprises an electromagnetic drive comprising an array of coil elements and a magnet arrangement and the second drive comprises an electromagnetic drive comprising an array of coil elements and a magnet arrangement
   wherein the stationary base element comprises a stationary base element circuit board and the second positioning element comprises a second positioning element circuit board;
   wherein the coil element of the electromagnetic drive of the first drive is integrated into the stationary base element circuit board and the coil element of the electromagnetic drive of the second drive is integrated into the second positioning element circuit board;
   wherein the first positioning element comprises a metallic support element made of aluminum and is disposed between the stationary base element and the second positioning element; and
   wherein the magnet arrangement of the first drive corresponds to a Halbach array and the magnet arrangement of the second drive corresponds to a Halbach array.

2. The two-axis positioning device according to claim 1, wherein the magnet arrangement of the first drive is arranged on the metallic support element, and the magnet arrangement of the first drive co-acts with coil element of the first drive.

3. The two-axis positioning device according to claim 1, wherein a communication module is integrated into either the stationary base element circuit board or the second positioning element circuit board.

4. The two-axis positioning device according to claim 1, wherein either the stationary base element circuit board or the second positioning element circuit board comprises a receiving device for a bearing or for a sensor element.

5. The two-axis positioning device according to claim 1, wherein the stationary base element circuit board is electrically connected to the second positioning element circuit board via a flexible connection element.

6. The two-axis positioning device according to claim 1, wherein the stationary base element circuit board is identical to the second positioning element circuit board.

7. The two-axis positioning device according to claim 1, wherein the magnetic arrangement of the first drive is disposed opposite to the coil element of the first drive.

* * * * *